(12) United States Patent
Wu et al.

(10) Patent No.: US 12,279,715 B2
(45) Date of Patent: Apr. 22, 2025

(54) KITCHEN APPLIANCE

(71) Applicant: ELECTROLUX APPLIANCES AKTIEBOLAG, Stockholm (SE)

(72) Inventors: Peng Wu, Hangzhou (CN); Zhenquan Wu, Hangzhou (CN); Hongxuan Zhang, Hangzhou (CN)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 794 days.

(21) Appl. No.: 17/439,035

(22) PCT Filed: Mar. 6, 2020

(86) PCT No.: PCT/EP2020/055985
§ 371 (c)(1),
(2) Date: Sep. 14, 2021

(87) PCT Pub. No.: WO2020/187604
PCT Pub. Date: Sep. 24, 2020

(65) Prior Publication Data
US 2022/0151430 A1 May 19, 2022

(30) Foreign Application Priority Data
Mar. 20, 2019 (CN) .......................... 201910213998.6

(51) Int. Cl.
*A47J 36/24* (2006.01)
*A47J 36/26* (2006.01)
*H05B 6/06* (2006.01)

(52) U.S. Cl.
CPC ........... *A47J 36/2483* (2013.01); *A47J 36/26* (2013.01); *H05B 6/065* (2013.01); *H05B 2213/03* (2013.01)

(58) Field of Classification Search
CPC ....... A47J 36/2483; A47J 36/26; H05B 6/065; H05B 2213/03
See application file for complete search history.

(56) References Cited

U.S. PATENT DOCUMENTS

| | | | | |
|---|---|---|---|---|
| 2011/0192835 A1* | 8/2011 | Lee | .......................... | H05B 6/12 |
| | | | | 219/621 |
| 2012/0248098 A1* | 10/2012 | Lee | ...................... | H05B 6/1272 |
| | | | | 219/660 |

(Continued)

FOREIGN PATENT DOCUMENTS

| | | |
|---|---|---|
| CN | 201129771 | 10/2008 |
| CN | 105698230 | 6/2016 |

(Continued)

OTHER PUBLICATIONS

International Search Report and Written Opinion for PCT/EP2020/055985, dated May 18, 2020, 9 pages.

(Continued)

*Primary Examiner* — Thien S Tran
(74) *Attorney, Agent, or Firm* — Chrisman Gallo Tochtrop LLC

(57) ABSTRACT

A kitchen appliance is disclosed. The kitchen appliance comprises: a user interface control unit for interacting with a user; a plurality of driver units configured to control power supply to a plurality of coils; and the plurality of coils configured to heat one or more cookers based on electromagnetic induction effect, wherein each driver unit is configured to generate a control signal for a corresponding coil of the plurality of coils, and the control signal is used for controlling the power supply to the corresponding coil by controlling turn-on or turn-off of an insulated gate bipolar transistor (IGBT) in a single-pipe module.

15 Claims, 6 Drawing Sheets

(56) References Cited

U.S. PATENT DOCUMENTS

2019/0223263 A1* 7/2019 Park .................... H05B 6/42
2019/0327794 A1* 10/2019 Kwack ................. H05B 6/065

FOREIGN PATENT DOCUMENTS

| | | | | |
|---|---|---|---|---|
| CN | 205454133 | | 8/2016 | |
| DE | 102014215705 A1 * | | 2/2016 | ............ G08C 17/02 |
| EP | 2355617 | | 8/2011 | |
| EP | 2506668 | | 10/2012 | |
| EP | 3170363 | | 5/2017 | |
| EP | 3170363 B1 * | | 4/2018 | ............ H05B 6/065 |
| JP | 2001196156 | | 7/2001 | |

OTHER PUBLICATIONS

Chinese Office action (English translation) for related application No. 201910213998.6, dated May 22, 2023, 10 pages.

\* cited by examiner

KITCHEN APPLIANCE

TECHNICAL FIELD

The present invention relates generally to a kitchen appliance, and more particularly to a multi-cell electromagnetic heating device.

BACKGROUND

In some conventional multi-cell electromagnetic heating devices, a half-bridge driving scheme is usually adopted. In this scheme, two insulated gate bipolar transistors (IGBTs) are needed to control power supply to one coil, thus resulting in disadvantages such as high complexity, high cost, unreliability and the like.

In other conventional multi-cell heating devices, multiple single-pipe heating units are simply assembled, and each of them is supplied with rated power. It is necessary to provide at least a rectifier and a weak power module for each heating unit. This scheme cannot make full advantage of single-pipe switch solution.

SUMMARY OF THE INVENTION

With respect to the above defect, the present invention proposes a multi-cell heating device adopting a single-switch driving scheme, which has advantages such as less circuit elements, low cost, high operation reliability and the like.

A kitchen appliance according to the present invention comprises: a user interface control unit for interacting with a user; a plurality of driver units configured to control power supply to a plurality of coils; and the plurality of coils configured to heat one or more cookers based on electromagnetic induction effect, wherein each of the plurality of driver units is configured to generate a control signal for a corresponding coil of the plurality of coils, and the control signal is used for controlling the power supply to the corresponding coil by controlling turn-on or turn-off of an insulated gate bipolar transistor (IGBT) in a single-pipe module.

DETAILED DESCRIPTION OF THE EMBODIMENTS

Figure 1:
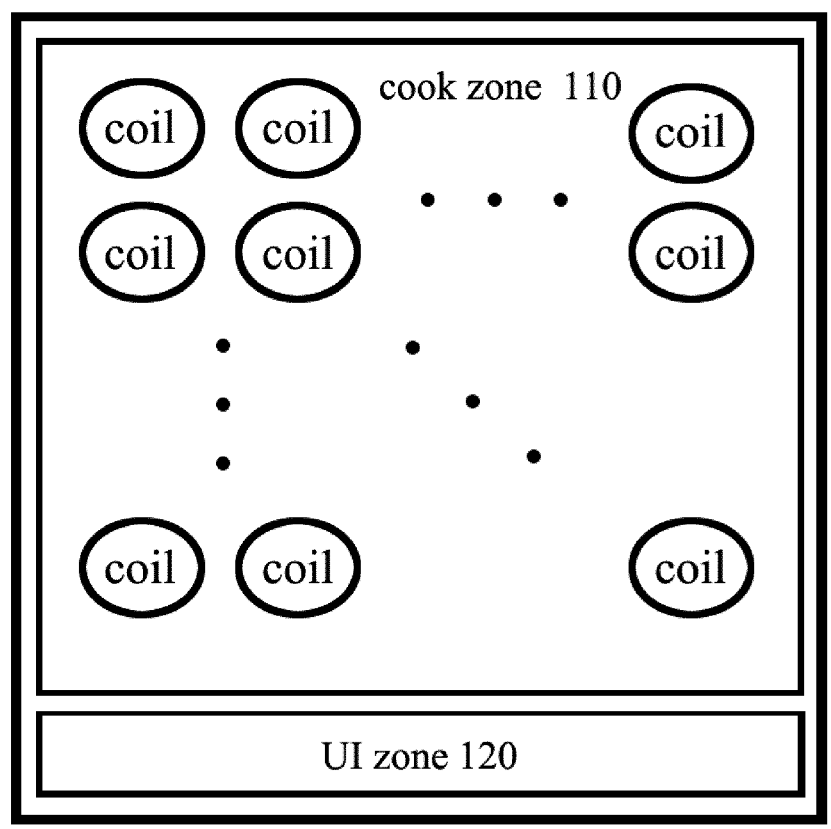
FIG. 1 is a schematic view showing an operating surface of multi-cell electromagnetic heating device.

FIG. 1 schematically shows an operating surface of multi-cell electromagnetic heating device. As shown in FIG. 1, the operating surface may be divided into a cooking zone 110 and a user interface (UI) zone 120. Components (not shown) for interacting with a user may be arranged in the UI zone 120, such as input means (such as button and the like) for the user to input instructions and output means (such as display screen and the like) for visually or acoustically outputting information to the user.

A plurality of coils are provided in the cooking zone 110. The coils may operate independently from one another, and thus may heat in combination or individually during cooking. Each coil and relevant elements for controlling or driving the coil constitute one heating unit, and thus the electromagnetic heating device comprises a plurality of heating units. The structure of the heating unit will be described below in detail.

It should be noted that, the number and arrangement of the plurality of coils are not limited to those shown in FIG. 1. Instead, it is possible to provide any number of coils and design a layout flexibly in the cooking zone 110. Some or all of the coils may work simultaneously while being controlled independently, and thereby a great flexibility in the combination of heating zones can be achieved.

Figure 2:
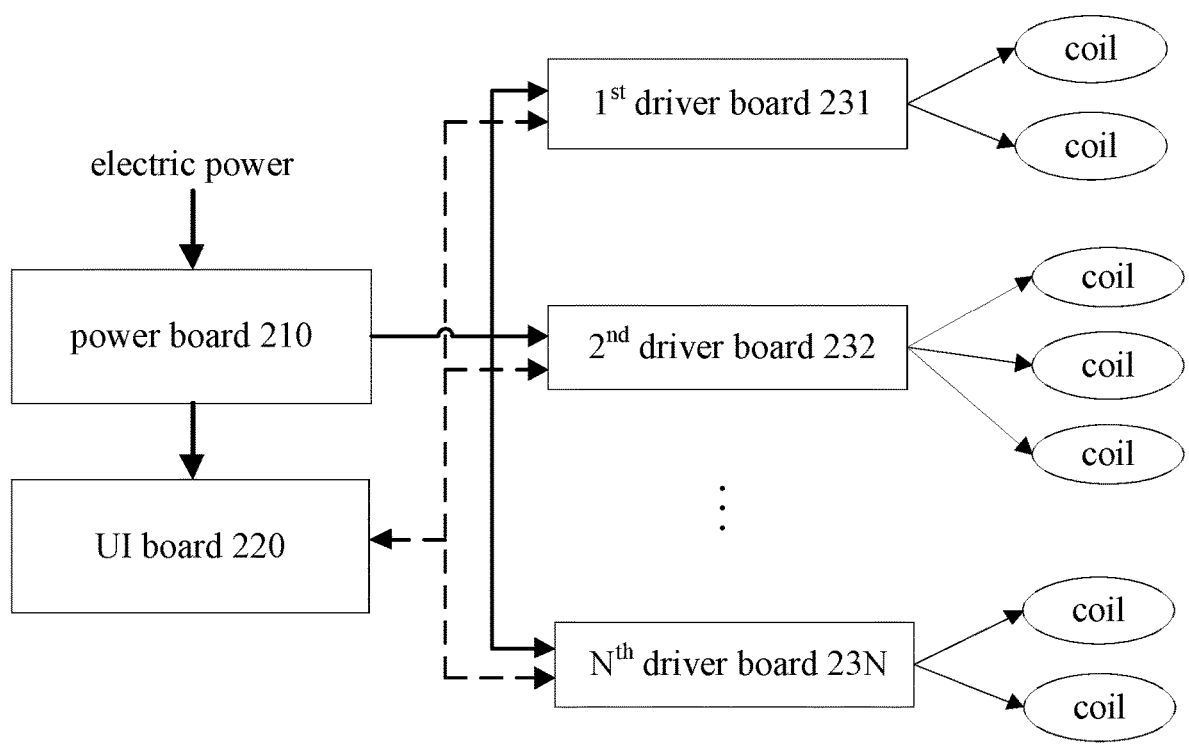
FIG. 2 is a schematic block diagram showing system architecture of the multi-cell heating device according to the present invention.

FIG. 2 schematically shows system architecture of the multi-cell heating device according to the present invention. As shown in FIG. 2, the heating device comprises a power board 210, a user interface (UI) board 220, and a plurality of driver boards 231-23N.

The power board 210 receives and converts power supplied from an external power source, and supplies DC forceful electric power to the first through N-th driver boards 231-23N and DC weak electric power to the first through N-th driver boards 231-23N and the UI board 220.

Each of the first through N-th driver boards 231-23N converts the DC forceful electric power received from the power board 210 into high-frequency AC electric power, and applies the high-frequency AC electric power to one or more coils. Based on electromagnetic induction effect, the AC current flowing through the coils may generate magnetic field which may in turn generate eddy currents in a pot made of iron or stainless steel for example. The generated eddy currents may cause the bottom of the pot to be heated rapidly, thereby heating food in the pot. FIG. 2 schematically shows multiple driver boards 231-23N and that the first driver board 231 drives two coils, the second driver board 232 drives three coils, and the N-th driver board 23N drives two coils. However, the present invention is not limited to this. Any number of the driver boards may be provided in the heating device according to the present invention, and each driver board may drive any number of the coils.

The UI board 220 may receive a command input by the user, and transmit the command to the first through N-th driver boards 231-23N. Moreover, the UI board 220 may receive state information on the coils and feedback information in response to the user's command from the first through N-th driver boards 231-23N.

Figure 3:
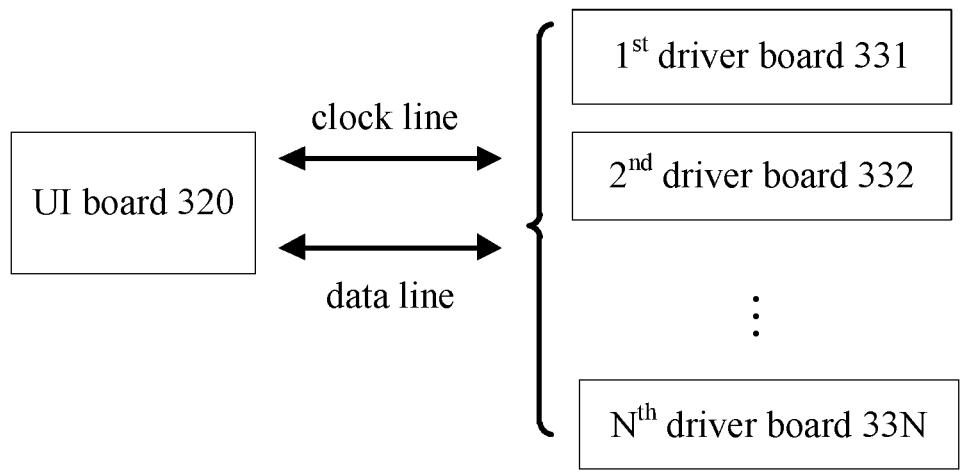
FIG. 3 is a schematic view showing communications between a user interface board and driver boards.

Communications between the UI board and the driver boards may be performed in accordance to inter-integrated circuit (IIC) protocol for example. As shown in FIG. 3, in IIC communications, the UI board 320 serves as a master device, and the first through N-th driver boards 331-33N serve as slave devices. The communications may be performed via a clock line and a data line.

Figure 4:
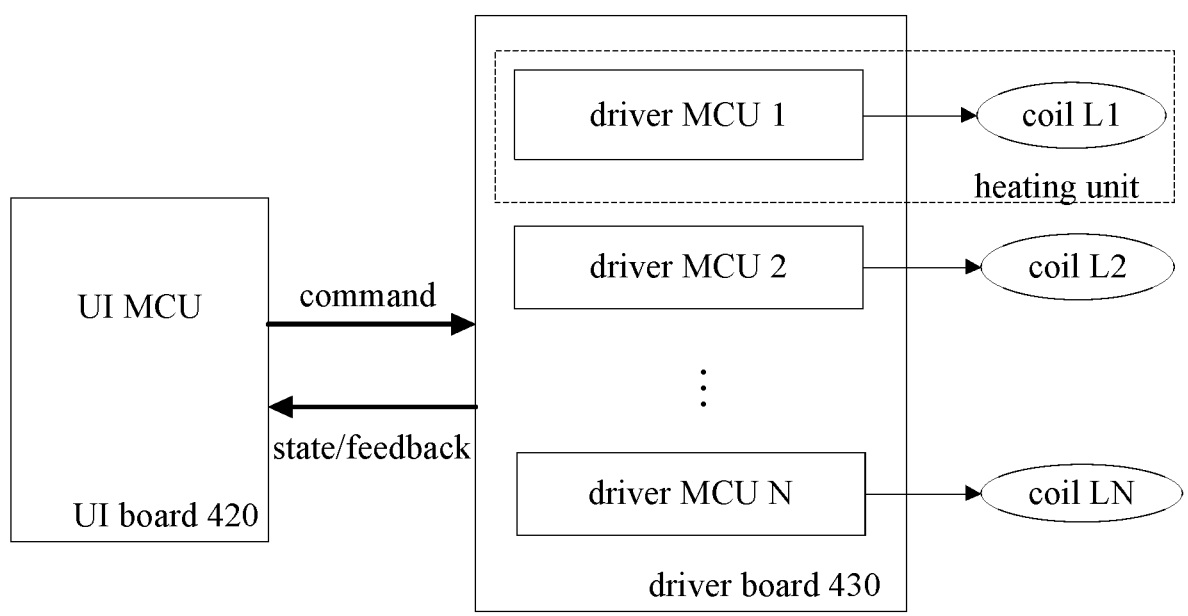
FIG. 4 is a schematic view showing communications between a user interface board and one driver board.

FIG. 4 schematically shows communications between a UI board and one driver board. As shown in FIG. 4, a UI board 410 comprises a micro-controller UI MCU for performing various processes, and a driver board 430 comprises a plurality of micro-controllers for performing processes, i.e., driver MCU 1 through driver MCU N. In order not to obscure the gist, components well-known to those skilled in the art, such as input and output components in the UI board 420, communication components in the UI board 420 and the driver board 430 and the like, are omitted in FIG. 4. Besides, it should be noted that, the UI board 420 and the driver board 430 each may comprise more or less microcontrollers than those shown in FIG. 4.

There is one-to-one correspondence between the driver MCUs and the coils. One driver MCU controls only one coil. The multiple coils L1-LN operate independently from one another, and each of the coils is controlled by the corresponding driver MCU. One driver MCU together with the corresponding coil and other associated elements constitute one heating unit.

The UI MCU receives an operation command (such as increasing/reducing power, turning off power, setting timing, and the like) input by the user, which command may be a control command with respect to all the coils or a control command with respect to a part of or a single one of the coils. The UI MCU transmits the operation command of the user to the corresponding one or more driver MCUs controlling the coils to which the command is directed. The driver MCU which has received the command controls operations of the corresponding coil in accordance to the command, and generates feedback information in response to the command based on the result of control, and then transmits the feedback information to the UI MCU. Optionally, the UI MCU may report to the user a result of executing the command based on the feedback information.

Moreover, each of the driver MCUs may detect state of the corresponding coil, such as pot state, power state and the like. The driver MCUs may transmit the detected state information to the UI MCU. The UI MCU may analyze the received state information of respective coils, so as to present the overall heating state of the heating device to the user through visual or acoustical output means.

In the configuration as shown in FIG. 4, the UI MCU may communicate with each of the driver MCUs, while the plurality of driver MCU 1-MCU N do not communicate with each other.

Figure 5:
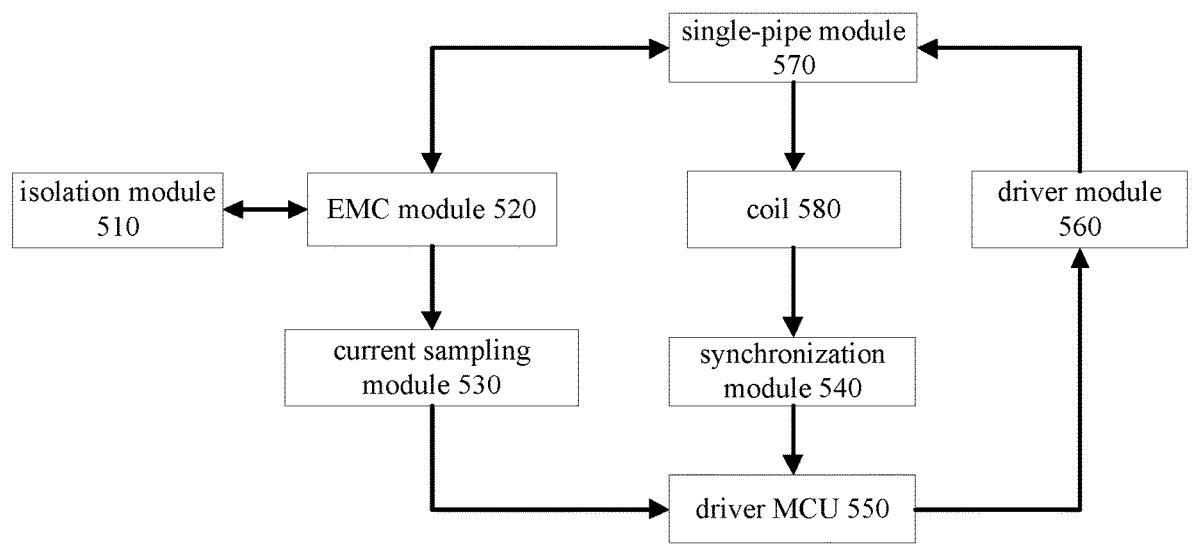
FIG. 5 is a schematic block diagram showing configuration of a heating unit.

FIG. 5 is a schematic block diagram showing configuration of a heating unit. As shown in FIG. 5, the heating unit comprises an isolation module 510, an electromagnetic compatibility (EMC) module 520, a current sampling module 530, a synchronization module 540, a driver MCU 550, a driver module 560, a single-pipe module 570 including an IGBT, and a coil 580. In particular, the coil 580 and a capacitor (not shown) may form a LC parallel resonant circuit, which will be described in detail with reference to FIG. 6.

Since a plurality of heating units in the heating device according to the present invention are powered by a common DC power source, the isolation module 510 is provided in each heating unit such that the respective heating units are electrically isolated from one another. As such, it is possible to prevent occurrence of mutual interference among the respective heating units, which is especially important for current sampling and synchronization. The isolation module 510 may be implemented with a single-way switch device (such as diode or single-way silicon controlled rectifier).

The EMC module 520 comprises elements such as inductors, capacitors and the like necessary for realizing functions of the circuitry. The current sampling module 530 comprises an in-phase amplifier. In the conventional configuration, the current sampling module usually employs an inverting amplifier, which however is not applicable to the present invention since it would prevent the system of the present invention from functioning normally and even would damage the IGBT element.

The synchronization module 540 is used for sensing electric potentials at two ends of the coil 580, and transmitting the sensed electric potentials to the driver MCU 550. The driver MCU 550 generates a control signal based on the received electric potentials at the two ends of the coil 580, and transmits the control signal to the driver module 560. In the present invention, the control signal may be implemented with a pulse width modulation (PWM) signal, and has a low voltage level of 5V for example.

As stated above, the UI MCU may receive from the driver MCUs the state information such as pot state. In this case, the UI MCU may determine, by analyzing the pot state information, a plurality of coils which are heating the same pot, and further may instruct a plurality of driver MCUs controlling the plurality of coils to generate such PWM signals that a difference between values of respective PWM signals is less than a predetermined threshold. This may advantageously reduce acoustic noise generated during heating.

The driver module 560 may be implemented with a power amplification circuit, which is used for amplifying the low-voltage and small-current control signal generated by the driver MCU 550 and applying the amplified control signal to the single-pipe module 570. The IGBT of the single-pipe module 570 is controlled according to the control signal, so as to control the heating power of the coil 580.

Figure 6:
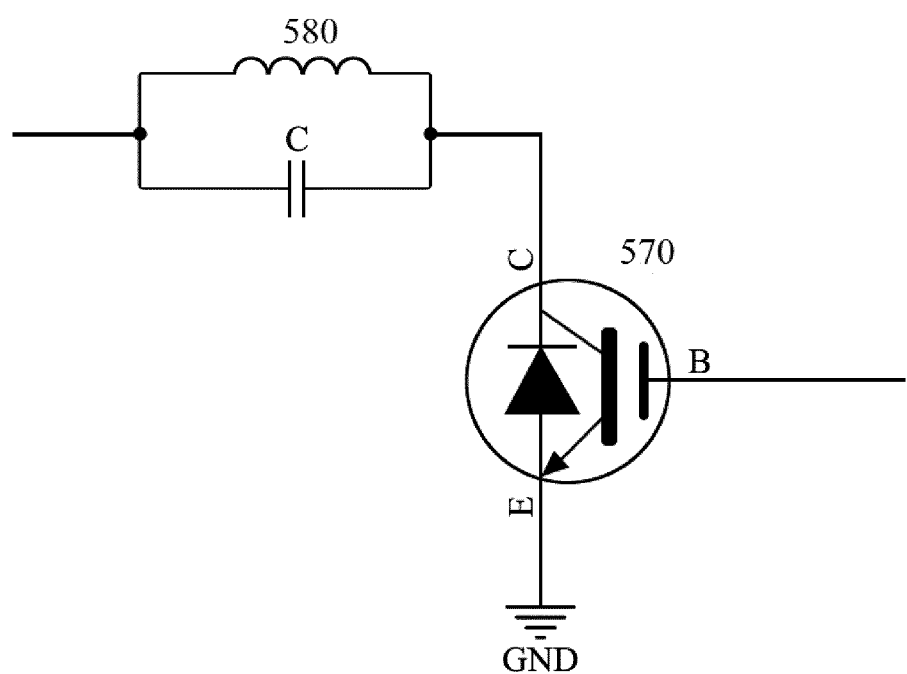
FIG. 6 is a circuit diagram of the single-pipe module and the coil as shown in FIG. 5.

FIG. 6 shows a circuit diagram of the single-pipe module and the coil in FIG. 5. As a comparison, FIG. 7 shows a circuit diagram of the conventional half-bridge driving scheme.

As shown in FIG. 6, the single-pipe module 570 is connected in series with an LC resonant circuit. In the LC resonant circuit the coil 580 (as inductor) is connected in parallel with a capacitor C. Therefore, in the heating device according to the present invention, only one IGBT element is needed to control power supply to one coil. Moreover, in the present invention, only one driver MCU is needed to control one coil.

Figure 7:
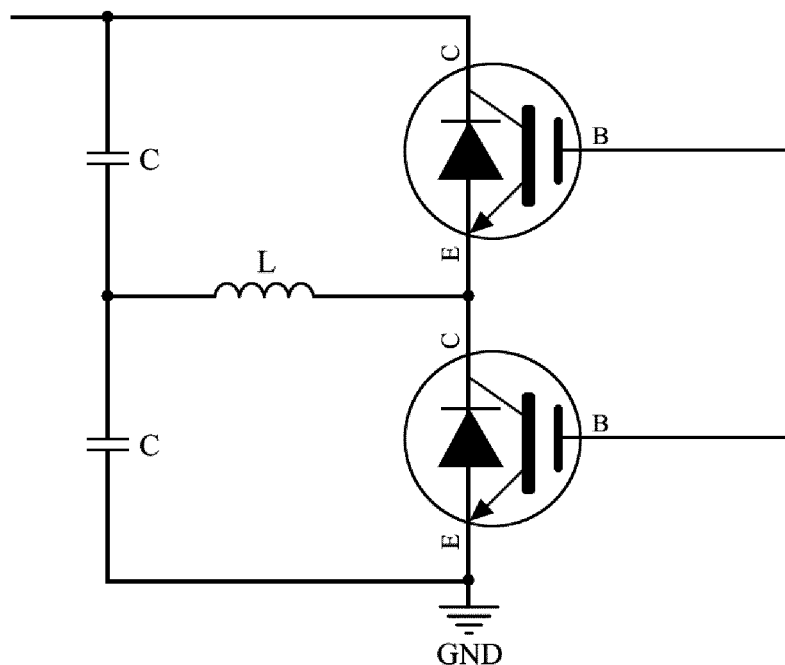
FIG. 7 is a circuit diagram of the conventional half-bridge driving scheme.

A half-bridge module and an LC resonant circuit are used in the half-bridge driving scheme as shown in FIG. 7. In the LC resonant circuit, a coil L (as inductor) is connected in series with a capacitor C. It can be seen that two IGBT elements are needed to control power supply to one coil. Moreover, in the conventional scheme, it is usually necessary to provide another micro-controller in the IGBT driver module in addition to the driver MCU. As such, two micro-controllers (MCUs) are needed to control one coil.

The half-bridge driving scheme may be advantageous in an electromagnetic heating device having a single heating unit, because it can realize high-power heating which cannot be realized by the single-switch driving scheme. However, for an electromagnetic heating device having multiple heating units, requirement on heating power of each heating unit is lowered, and thus the present invention uses a more economical single-pipe module in place of a half-bridge module, so as to reduce cost. Further, switch signals for the IGBT elements are more complicated in the half-bridge driving scheme. In the present invention, complexity of device is lowered and reliability of system is increased due to less circuit elements and the control signal of low voltage level.

In addition, in the present invention, since the number and layout of the coils may be arbitrarily set, it is possible to flexibly arrange heating zones to adapt to cookers in various shapes. Moreover, the multiple coils operate independently from one another, and thus it is possible to control each heating zone individually, thereby bringing convenience for the user's cooking.

The present invention may be implemented with software, hardware, or a combination thereof. Programs included in software may be stored in advance in a storage medium provided inside or outside a device. As an example, during execution, these programs are written into a random access memory (RAM) and executed by a processor (e.g. a CPU), so as to implement various functions or processes as described herein.

The modules or units as described herein are merely logical modules or units, and do not strictly correspond to physical devices or entities. For example, the function of each unit as described herein may be implemented by a plurality of physical entities, or, the functions of a plurality of units as described herein may be implemented by a single physical entity. Moreover, the features, components, elements, steps or the like as described in one embodiment are not limited to that embodiment, but may also be applied to another embodiment, for example by replacing specific features, components, elements, steps or the like in the other embodiment, or combined with them.

The scope of the present invention is not limited to the embodiments described above with reference to the drawings as well as technical effects thereof. Those skilled in the art should understand that, depending on design requirements and other factors, various variants or modifications may be made to the embodiments as discussed in the present disclosure without departing from the principle and spirit of the present invention. The scope of the present invention is defined by the appended claims and equivalents thereof.

Moreover, the present invention may also be configured as follows.

A kitchen appliance, comprising:
a user interface control unit for interacting with a user;
a plurality of driver units configured to control power supply to a plurality of coils; and
the plurality of coils configured to heat one or more cookers based on electromagnetic induction effect,
wherein each of the plurality of driver units is configured to generate a control signal for a corresponding coil of the plurality of coils, and
the control signal is used for controlling the power supply to the corresponding coil by controlling turn-on or turn-off of an insulated gate bipolar transistor (IGBT) in a single-pipe module.

The kitchen appliance further comprises the IGBT, which is connected in series with a resonant circuit containing the coil and is configured to be turned on or turned off according to the control signal. In the resonant circuit, the coil is connected in parallel with a capacitor.

The plurality of coils are controlled independently from one another, so as to heat in combination or individually.

The user interface control unit is configured to transmit a command input by the user to the driver unit, and to receive feedback information in response to the command from the driver unit.

The driver unit is configured to generate the control signal for controlling the single-pipe module, according to the command.

The driver unit is configured to detect state of the corresponding coil, and to transmit the detected state to the user interface control unit.

The detected state comprises state of the cooker. The user interface control unit is configured to determine the coils which are heating the same cooker based on the received state of the cooker, and to instruct the driver units corresponding to the determined coils to generate such control signals that a difference between values of the control signals is less than a predetermined threshold.

The user interface control unit communicates with the driver unit using inter-integrated circuit (IIC) protocol.

The kitchen appliance comprises a plurality of heating units, each of the heating units comprising:
one driver unit of the plurality of driver units;
a single-pipe module controlled by the one driver unit;
a coil controlled by the one driver unit; and
an isolation unit configured to electrically isolate the heating unit from other heating units.

Each of the heating units further comprises a driver module configured to perform power amplification on the control signal of low voltage level generated by the one driver unit, and to apply the power-amplified control signal to the single-pipe module.

The kitchen appliance further comprises a power unit configured to receive power from an external source, and to supply common DC forceful electric power to the plurality of heating units and supply common DC weak electric power to the plurality of heating units and the user interface control unit. In each of the heating units, the DC forceful electric power is converted into high-frequency AC electric power to drive the coil.

The invention claimed is:

1. A kitchen appliance, comprising:
a user interface control unit for interacting with a user;
a plurality of driver units configured to control power supply to a plurality of coils; and
the plurality of coils configured to heat one or more cookers based on electromagnetic induction effect,
wherein each of the plurality of driver units is configured to generate a control signal for a corresponding coil of the plurality of coils,
wherein each of the plurality of driver units comprises at least two driver microcontrollers, wherein each driver microcontroller of said at least two driver microcontrollers is configured to drive one of the plurality of coils with an alternating current (AC) power being converted from a direct current (DC) power, and
the control signal of each of the plurality of driver units is used for controlling turn-on or turn-off of an insulated gate bipolar transistor (IGBT) in a single-pipe module in order to control the power supply to the corresponding coil.

2. The kitchen appliance according to claim 1,
wherein the kitchen appliance further comprises the IGBT, which is connected in series with a resonant circuit containing the coil and is configured to be turned on or turned off according to the control signal, and
wherein the coil is connected in parallel with a capacitor in the resonant circuit.

3. The kitchen appliance according to claim 1, wherein the plurality of coils are controlled independently from one another, so as to heat in combination or individually.

4. The kitchen appliance according to claim 1, wherein the user interface control unit is configured to transmit a command input by the user to an associated one of the driver units, and to receive feedback information in response to the command from the associated driver unit.

5. The kitchen appliance according to claim 4, wherein the associated driver unit is configured to generate the control signal for controlling the single-pipe module, according to the command.

6. The kitchen appliance according to claim 1, wherein each said driver unit is configured to detect state of the corresponding coil, and to transmit the detected state to the user interface control unit.

7. The kitchen appliance according to claim 6,
wherein the detected state comprises state of the corresponding cooker, and
wherein the user interface control unit is configured to determine the coils which are heating a common one of said cookers based on the received state thereof, and to instruct the driver units corresponding to the determined coils to generate such control signals that a difference between values of the control signals is less than a predetermined threshold.

8. The kitchen appliance according to claim 4, wherein the user interface control unit communicates with the associated driver unit using inter-integrated circuit (IIC) protocol.

9. The kitchen appliance according to claim 1, wherein the kitchen appliance comprises a plurality of heating units, each of the heating units comprising:
one driver unit of the plurality of driver units;
a single-pipe module controlled by the one driver unit;
a coil of the plurality of coils that is controlled by the one driver unit; and
an isolation unit configured to electrically isolate each said heating unit from other heating units.

10. The kitchen appliance according to claim 9, wherein each of the heating units further comprises a driver module configured to perform power amplification on the control signal of low voltage level generated by the one driver unit, and to apply the power-amplified control signal to the single-pipe module.

11. The kitchen appliance according to claim 9, further comprising:
a power unit configured to receive power from an external source, and to supply common direct current (DC) forceful electric power to the plurality of heating units and supply common DC weak electric power to the plurality of heating units and the user interface control unit,
wherein in each of the heating units, the DC forceful electric power is converted into high-frequency alternating current (AC) electric power to drive the respective coil.

12. A kitchen appliance, comprising:
a plurality of heating units, each heating unit comprising:
an induction coil; and
a driver microcontroller configured to drive the induction coil with an alternating current (AC) power based on a control command, the AC power being converted from a direct current (DC) power;
a plurality of driver circuit boards, each of the driver circuit boards comprising at least two of the driver microcontrollers;
a user interface circuit board configured to receive an input from a user and to generate and communicate the control command to a corresponding driver circuit board based on the received input; and
a power circuit board configured to receive the DC power and to supply the DC power to the driver circuit boards and to the user interface circuit board,
wherein communication between the user interface circuit board and the driver circuit boards is performed in accordance with an inter-integrated circuit (IIC) protocol, the user interface circuit board being a master device and the driver circuit boards being slave devices, and
wherein at least a portion of the induction coils operate simultaneously while being controlled independently.

13. The kitchen appliance according to claim 12, wherein each heating unit further comprises:
an in-phase amplifier configured to sample a current through the heating unit;
a voltage detecting circuit configured to detect an electric potential at each end of the induction coil and to transmit the detected electric potentials to the driver microcontroller, the driver microcontroller being configured to generate a control signal based on the control command and the detected electric potentials, the control signal being a pulse width modulation (PWM) signal;
a power amplification circuit configured to amplify the control signal; and
a single insulated gate bipolar transistor (IGBT) connected in series with an LC circuit, the LC circuit comprising the induction coil and a capacitor connected in parallel, the IGBT being controlled according to the amplified control signal.

14. The kitchen appliance according to claim 12,
wherein the driver circuit boards are further configured to communicate state information related to the induction coils to the user interface circuit board, and
wherein the user interface circuit board is further configured to present heating state information of the kitchen appliance to the user based on the state information communicated by the driver circuit boards.

15. The kitchen appliance according to claim 12,
wherein the driver circuit boards are further configured to communicate state information related to the induction coils to the user interface circuit board, and
wherein the user interface circuit board is configured to generate the control command further based on the state information communicated by the driver circuit boards.

* * * * *